3,160,641
PURIFICATION OF ISOSORBIDE
Ludwig A. Hartmann, Swarthmore, Pa., assignor to Atlas Chemical Industries, Inc., Wilmington, Del., a corporation of Delaware
No Drawing. Filed Aug. 7, 1961, Ser. No. 129,506
7 Claims. (Cl. 260—347.8)

This invention relates to the production of isosorbide and more particularly to a process for purifying isosorbide prepared by vacuum distillation of the acid catalyzed dehydration product of sorbitol.

It is well known that when sorbitol is dehydrated, for example by heating with sulfuric acid catalyst under reduced pressure until substantially two molecular proportions of water have been removed, a major component of the resulting product is isosorbide. Isosorbide may be recovered from the dehydration mixture by fractional distillation in a form sufficiently pure for many uses. It is a crystalline solid at room temperature and may be further purified, if desired, by taking up in a suitable solvent and recrystallizing in the conventional manner.

It has been found that isosorbide dinitrate has valuable pharmaceutical properties and for the preparation of this ester it is most desirable to employ isosorbide of a high degree of purity. Particularly it is desired to remove, or at least minimize the content of, impurities which are oxidized by periodic acid in dilute solution at room temperature. Isosorbide itself is unreactive with periodic acid but impurities reactive therewith are present in the crude product obtained by dehydration of sorbitol and are difficult to remove economically by the usual physical operations of fractional distillation and fractional crystallization.

In accordance with the present invention periodate-consuming impurities in isosorbide are removed by treating the impure isosorbide product with a boron compound supplying borate ion and recovering purified isosorbide from the resulting borate treated mixture. Preferably the process of the invention is not applied to the crude dehydration product of sorbitol but to isosorbide which has been distilled from such a product under reduced pressure. It has been found that substantially all of the isosorbide may be so separated from the dehydration mixture, and that it will contain sufficient impurity to consume from 0.05 to 0.2 milli-equivalents (meq.) of periodate per gram of product. The periodate consumption is determined in known manner by adding to an aqueous solution of the weighed isosorbide sample a measured (excess) quantity of standardized periodic acid reagent solution, allowing the mixture to stand at room temperature for an hour, adding an excess of potassium iodide solution and titrating the liberated iodine with standard thiosulfate solution. A blank on the reagents is run similarly and from difference in titrations between the blank and the sample the milliequivalents of periodic acid reduced per gram of sample is calculated.

The boron compound furnishing borate ion for treatment of isosorbide in accordance with the invention may conveniently be boric acid. Borax or other boric acid salts may equally well be employed.

The contact between the boron compound and the isosorbide to be purified may be effected in any suitable manner. For example, boric acid may be added directly to the isosorbide and heated until it goes into solution. Alternatively an aqueous solution of boric acid or of a borate may be stirred into the molten isosorbide. Another method of effecting contact is to charge an anion exchange column with borate ion in known manner and percolate a solution of the impure isosorbide therethrough. By this latter means, treatment of the isosorbide with boron compound and separation of the purified isosorbide from the treated mixture occur simultaneously since the impurity is complexed with the borate adsorbed in the column and the effluent is a solution of the purified isosorbide.

When borate is added to the isosorbide in bulk, separation of purified isosorbide from the treated mixture may be conveniently effected by vacuum distillation or by passing a solution, preferably non-aqueous, of the treated mixture through a column of anion exchange resin.

The amount of boric acid to be employed in the process of the invention will vary with the amount of periodate consuming impurity present in the isosorbide to be treated, which latter amount may conveniently be expressed in terms of meq. of periodate consumed per gram of product determined as outlined above. Significant improvement with respect to the said impurity is effected when as little as a half millimole of boric acid (or its equivalent in borate ion) is employed per meq. of periodate consumption by the isosorbide product to be treated. In order to remove the periodate consuming impurity more completely it is preferred to use larger proportions of borate ion such as from 1.0 to 2.0 millimoles of boric acid equivalent per meq. of periodate consumption. Even larger proportions can be employed but the added gain in purity of final product does not justify the use of more than about 3.5 millimoles of boric acid per milliequivalent of periodate consumption.

The invention will be more clearly understood from a consideration of the following examples which are presented for the purpose of illustration and are not to be construed as defining or limiting the scope of the invention.

*Example 1*

A 100 ml. three-neck flask was equipped with a capillary bubbler, thermometer, and a Claisen still-head. The reaction vessel was connected to a vacuum pump through a short air-condenser, receiver, and a Dry Ice trap. The flask was charged with 43.2 g. of dry isosorbide distilled from the acid catalyzed dehydration of sorbitol. The isosorbide had a periodate consumption of 0.17 meq./g. Boric acid (0.86 g.) was added to the charge after melting. This corresponds to 1.9 millimoles boric acid per meq. of periodate consumption. Vacuum was applied gradually at 73° C. and the pressure reduced to 0.3 mm. while water was given off vigorously. The temperature was raised from 75° to 124° within about 40 minutes after the pressure had reached 0.3 mm. at which temperature isosorbide began to distill. Distillation was continued at a pot temperature of 124–150°/0.35 mm. and at a vapor temperature of 119–120° for three hours. Yield: 33.4 g. (77.4%); periodate consumption: 0.02 meq./g. Residue: 9.1 g.

An aqueous solution of the residue (74% water) yielded a periodate consumption of 0.175 meq./g. On a dry basis, this corresponds to 0.7 meq./g. periodate consumption of the residue.

When another portion of the same isosorbide was distilled in the same manner with the exception that no boric acid was added a yield of 72.6% isosorbide was obtained and, on analysis, its periodate consumption was found to be 0.096 meq. per gram. The presence of boric acid during distillation resulted in the recovery of a larger proportion of the available isosorbide in which the concentration of periodate consuming impurity had been reduced by nearly 90% as compared to the 43% improvement in this regard when the distillation was conducted in the absence of boric acid.

*Example 2*

The process of Example 1 was repeated with the exception that only 0.43 gram of boric acid (0.95 millimole per meq. periodate consumption) was employed. The yield was 86.5% of the isosorbide charged and the periodate consumption of the distillate was 0.048 milliequivalent per gram.

*Example 3*

A portion of crude isosorbide, obtained as distillate during fractionation of isosorbide samples and exhibiting the very high periodate consumption of 1.75 meq. per gram was treated with 6.77% of boric acid (0.62 millimoles per meq. periodate consumption) and distilled to yield 39.2% of its weight of an isosorbide exhibiting a periodate consumption of 0.30 meq. per gram. The concentration of impurity is thus seen to be decreased by 83% in the process.

When another portion of crude isosorbide obtained in substantially the same way and with a periodate consumption value of 1.58 meq. per gram was distilled under the same physical conditions but without the addition of boric acid, the distilled isosorbide (41.2% yield) actually showed an increase in periodate consumption, to a value of 2.41 meq. per gram.

*Example 4*

Employing the apparatus described in Example 1, 71.4 grams of dry isosorbide having a periodate consumption of 0.17 meq. per gram was heated with 1.07 grams (1.4 millimoles per meq. periodate) of boric acid to 75° C. in about 35 minutes and held at 75° to 85° C. for an hour, all at a pressure of 0.6 to 0.7 millimeters of mercury. A portion (27.2 grams) of the "borated" mixture was then dissolved in 70 ml. absolute ethanol for passage through an ion exchange column. The ion exchange column, of about 250 ml. volume, was a strongly basic anion exchange resin (IRA-401, Rohm & Haas), activated by passage of about 500 ml. of 4% sodium hydroxide therethrough followed by rinsing with distilled water. Finally, water was displaced from the resin by passing 600 ml. of absolute ethanol through it at a slow rate.

The alcoholic solution of borate treated isosorbide was then passed through the resin at a rate of about 1 drop per second and followed by additional alcohol. The first portion of effluent (400 ml.) was evaporated in a current of air and finally under vacuum at 1 millimeter and 60–70° C. for 30 minutes. The residue was 10.7 grams (39.3% yield) of purified isosorbide with a periodate consumption of 0.009 meq. per gram. Elution of the column with absolute alcohol was continued until about 700 ml. total alcohol had been employed. On evaporation of solvent from the second elution a further 11.8 grams (43.4% yield) of purified isosorbide was obtained with a periodate consumption value of 0.005. Thus the total recovery was 82.7% of the isosorbide product charged to the column with an average periodate consumption value of 0.0069 meq. per gram.

*Example 5*

A 250 ml. bed of strong anion exchange resin (IRA-401) was activated with 750 ml. of 4% sodium hydroxide solution and rinsed free of base with water. It was then charged with borate ion by passing 200 ml. of warm 5% boric acid solution therethrough and rinsing with 800 ml. water. 52.6 grams (dry basis) of distilled isosorbide showing a periodate consumption of 0.17 meq. per gram was dissolved in 67.4 grams water and the solution passed through the column at a rate of about 2 drops per second. The solution was followed through the column by water to elute the isosorbide. Collection of effluent was started as soon as product appeared therein and continued for 30 minutes, to a volume of 400 ml. The isosorbide was recovered by evaporation of the solvent on a steam bath in a current of air. The yield was 51.3 grams (49.9 grams dry basis) corresponding to 94.8% of the isosorbide charged to the experiment. Its periodate consumption was 0.015 meq. per gram (D.B.).

What is claimed is:

1. The process of purifying isosorbide from the acid catalyzed dehydration product of sorbitol which comprises treating the said product with a boron compound supplying borate ion and recovering purified isosorbide from the resulting boron treated mixture.

2. The process of purifying isosorbide obtained by vacuum distillation of the acid catalyzed dehydration product of sorbitol which comprises treating the said distilled isosorbide with a boron compound supplying borate ion and recovering purified isosorbide from the resulting boron treated mixture.

3. The process of removing periodate-consuming impurities from isosorbide obtained by vacuum distillation of the acid catalyzed dehydration of sorbitol which comprises treating the said distilled isosorbide with from 0.5 to 3.5 boric acid millimole equivalents of a boron compound supplying borate ion per milliequivalent of periodate consumption exhibited by the said isosorbide and recovering pure isosorbide from the resulting boron treated mixture.

4. The process of claim 3 wherein the said boron compound is boric acid and the said recovery is by vacuum distillation of the boric acid treated mixture.

5. The process of claim 3 wherein the said boron compound is boric acid and the said recovery is effected by treating a solution of the boric acid treated mixture with an anion exchange resin.

6. The process of claim 5 wherein the said solution is an alcoholic solution.

7. The process of purifying isosorbide obtained by vacuum distillation of the acid catalyzed dehydration product of sorbitol which comprises passing a solution of the said distilled isosorbide through a bed of anion exchange resin in the form of its borate salt.

References Cited in the file of this patent

UNITED STATES PATENTS 2,899,470     Goldstein _____ Aug. 11, 1959

OTHER REFERENCES

Hockett et al.: J. Amer. Chem. Soc., vol. 68 (1946), pages 927–30.

Cram et al.: Organic Chemistry (McGraw-Hill, 1959), pages 433–4 and 504.